US012679271B2

(12) United States Patent (10) Patent No.: US 12,679,271 B2
Uken (45) Date of Patent: Jul. 14, 2026

(54) VEHICULAR INTERIOR REARVIEW MIRROR ASSEMBLY

(71) Applicant: Magna Mirrors of America, Inc., Holland, MI (US)

(72) Inventor: John T. Uken, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 347 days.

(21) Appl. No.: 18/360,875

(22) Filed: Jul. 28, 2023

(65) Prior Publication Data

US 2024/0042931 A1 Feb. 8, 2024

Related U.S. Application Data

(60) Provisional application No. 63/370,126, filed on Aug. 2, 2022.

(51) Int. Cl.
B60R 1/04 (2006.01)
(52) U.S. Cl.
CPC ...................................... B60R 1/04 (2013.01)
(58) Field of Classification Search
CPC ......................................................... B60R 1/04
See application file for complete search history.

(56) References Cited

U.S. PATENT DOCUMENTS

| | | | |
|---|---|---|---|
| 3,887,156 A | * | 6/1975 | Hugonnier ................ B60R 1/06 |
| | | | 248/549 |
| 4,936,533 A | | 6/1990 | Adams et al. |

| | | | |
|---|---|---|---|
| 5,100,095 A | | 3/1992 | Haan et al. |
| 5,151,828 A | | 9/1992 | Sugimura |
| 5,788,205 A | * | 8/1998 | Hansen ..................... B60R 1/04 |
| | | | 248/468 |
| 5,820,097 A | | 10/1998 | Spooner |
| 6,250,148 B1 | | 6/2001 | Lynam |
| 6,278,377 B1 | | 8/2001 | DeLine et al. |
| 6,318,870 B1 | | 11/2001 | Spooner et al. |
| 6,326,613 B1 | | 12/2001 | Heslin et al. |
| 6,329,925 B1 | | 12/2001 | Skiver et al. |
| 6,420,975 B1 | | 7/2002 | DeLine et al. |
| 6,428,172 B1 | | 8/2002 | Hutzel et al. |
| 6,445,287 B1 | | 9/2002 | Schofield et al. |
| 6,483,438 B2 | | 11/2002 | DeLine et al. |
| 6,501,387 B2 | | 12/2002 | Skiver et al. |
| 6,540,193 B1 | | 4/2003 | DeLine |
| 6,690,268 B2 | | 2/2004 | Schofield et al. |

(Continued)

*Primary Examiner* — Edmond C Lau

(74) *Attorney, Agent, or Firm* — HONIGMAN LLP

(57) ABSTRACT

A vehicular interior rearview mirror assembly includes a mirror head adjustable about a mounting base configured to attach at an interior portion of a vehicle. The mirror head includes a mirror reflective element. The mounting base is configured to attach at the interior portion of the vehicle via a threaded fastener. The threaded fastener includes a head end and a threaded end that threadedly engages the interior portion of the vehicle. A compressible component is disposed between the head end of the threaded fastener and the mounting base. With the mounting base attached at the interior portion of the vehicle, and responsive to movement of the mounting base relative to the threaded fastener and the interior portion of the vehicle, the compressible component at least partially compresses to accommodate movement of the mounting base.

20 Claims, 5 Drawing Sheets

(56)     References Cited

U.S. PATENT DOCUMENTS

| 6,824,281 B2 | 11/2004 | Schofield et al. |
| 6,877,709 B2 | 4/2005 | March et al. |
| 7,004,593 B2 | 2/2006 | Weller et al. |
| 7,249,860 B2 | 7/2007 | Kulas et al. |
| 7,289,037 B2 | 10/2007 | Uken et al. |
| 7,480,149 B2 | 1/2009 | DeWard et al. |
| 7,946,505 B2 | 5/2011 | Lynam et al. |
| 8,256,821 B2 | 9/2012 | Lawlor et al. |
| 8,451,332 B2 | 5/2013 | Rawlings |
| 8,508,831 B2 | 8/2013 | De Wind et al. |
| 8,730,553 B2 | 5/2014 | De Wind et al. |
| 8,743,203 B2 | 6/2014 | Karner et al. |
| 8,851,690 B2 | 10/2014 | Uken et al. |
| 9,156,403 B2 | 10/2015 | Rawlings et al. |
| 9,352,692 B2 | 5/2016 | Uken et al. |
| 10,000,156 B2 | 6/2018 | Koetje |
| 10,166,924 B2 | 1/2019 | Baur |
| 10,442,360 B2 | 10/2019 | LaCross et al. |
| 10,744,944 B2 | 8/2020 | Steffes |
| 10,752,174 B2 | 8/2020 | Koetje |
| 11,242,008 B2 | 2/2022 | Blank et al. |
| 2003/0112536 A1 | 6/2003 | Wachi |
| 2006/0050018 A1 | 3/2006 | Hutzel et al. |
| 2009/0295181 A1 | 12/2009 | Lawlor et al. |
| 2010/0085653 A1 | 4/2010 | Uken et al. |
| 2011/0096427 A1 | 4/2011 | Uken et al. |
| 2013/0112836 A1 | 5/2013 | Rawlings |
| 2014/0097320 A1 | 4/2014 | Rizk et al. |
| 2014/0133043 A1 | 5/2014 | Watson |
| 2014/0226012 A1 | 8/2014 | Achenbach |
| 2014/0293169 A1 | 10/2014 | Uken et al. |
| 2015/0251605 A1 | 9/2015 | Uken et al. |
| 2019/0258131 A9 | 8/2019 | Lynam et al. |
| 2020/0377022 A1 | 12/2020 | LaCross et al. |

* cited by examiner

VEHICULAR INTERIOR REARVIEW MIRROR ASSEMBLY

CROSS REFERENCE TO RELATED APPLICATION

The present application claims the filing benefits of U.S. provisional application Ser. No. 63/370,126, filed Aug. 2, 2022, which is hereby incorporated herein by reference in its entirety.

FIELD OF THE INVENTION

The present disclosure relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

A vehicular interior rearview mirror assembly for a vehicle includes a mirror head adjustably disposed at a mounting base or mounting structure configured to attach at an interior portion of a vehicle equipped with the vehicular interior rearview mirror assembly. The mirror head includes a mirror reflective element, and the mounting base includes a mounting arm and an attachment portion. The mounting base is configured to attach at the interior portion of the vehicle via a threaded fastener that includes a head end and a threaded end opposite the head end, where the threaded end is threadedly received at the interior portion of the vehicle to secure the mounting base at the interior portion. The attachment portion may include a recess in which a compressible component is disposed, and the compressible component is disposed between the head end of the threaded fastener and the mounting base. The compressible component compresses in response to the mounting base moving relative to the interior portion of the vehicle, such as when a force greater than a threshold force is applied at the mirror head or at the mounting arm.

The fastener may extend through the compressible component. The compressible component may include a conical-shaped element and the recess may include a conical-shaped recess. The compressible component may be formed of a rubber material or may include a spring.

These and other objects, advantages, purposes and features of the present invention will become apparent upon review of the following specification in conjunction with the drawings.

DESCRIPTION OF THE PREFERRED EMBODIMENTS

Figure 1:
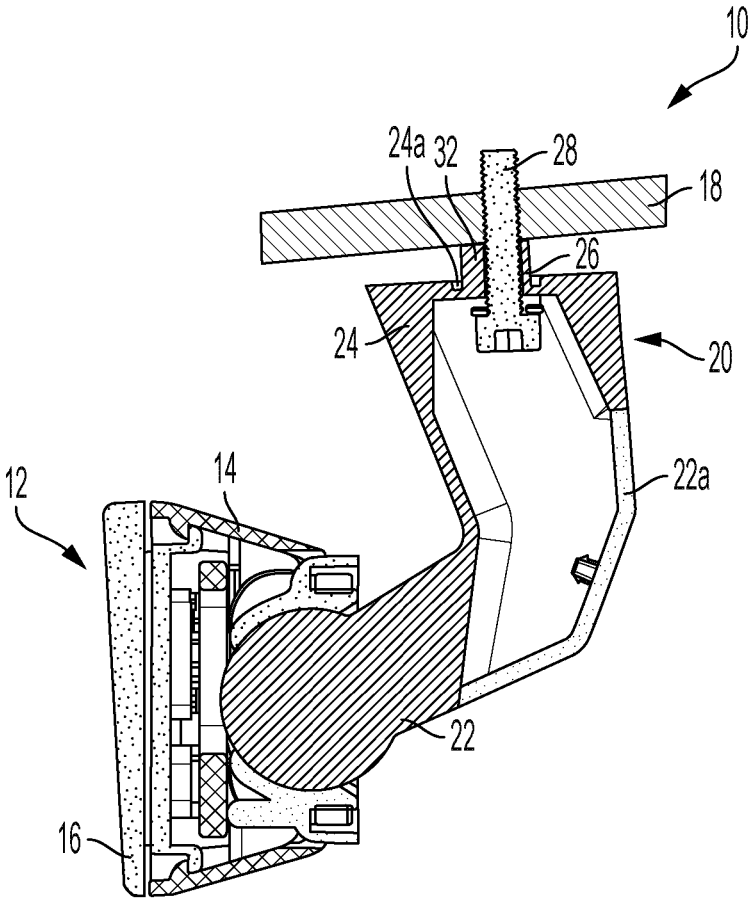
FIG. 1 is a sectional view of an interior rearview mirror assembly with a mounting base secured at an interior portion of a vehicle via a threaded fastener.

Referring now to the drawings and the illustrative embodiments depicted therein, an interior rearview mirror assembly 10 for a vehicle includes a mirror head 12 having a mirror casing 14 and a reflective element 16 positioned at a front portion of the casing 14 (FIG. 1). In the illustrated embodiment, the mirror assembly 10 is configured to be adjustably mounted to an interior portion 18 of a vehicle (such as to an interior or in-cabin surface of a vehicle windshield or a headliner of the vehicle or the like) via a mounting structure or mounting configuration or stay or base or assembly 20. The mounting structure 20 may be coupled to the mirror head 12 (such as via one or more pivot joints) to pivotally couple the mirror head 12 to the interior portion 18 of the vehicle. The mirror reflective element may comprise a single reflectance mirror reflective element or a prismatic mirror reflective element or a variable reflectance mirror reflective element that varies its reflectance responsive to electrical current applied to conductive coatings or layers of the reflective element.

To comply with regulations that require the mirror assembly to deflect, collapse or break away when a threshold force (such as 400 Newtons or less) is applied at the mirror assembly, single-ball stay arms may utilize a spring clip attachment to the vehicle. However, spring clip attachment structure is installed with a sliding motion or a twisting motion, such as a twisting motion of about 25 degrees to 90 degrees or more. Sliding and twisting installation may require training and special tooling and may not be ergonomic in the factory. Further, sliding and twisting installation may create keep-out zones or interference regions surrounding the mirror assembly where neighboring components of the mirror assembly, such as cameras or wire harnesses or cables, cannot be installed before or during assembly of the mirror assembly to avoid interference with the sliding or twisting installation motion of the mirror assembly mounting structure.

Moreover, mounting structure that breaks away from the interior portion of the vehicle when force is applied at the mirror assembly may not be repeatable and may have fatigue issues with vibration and normal use. Further, it may be difficult to detect a part that is too strong (and thus may not break away when the threshold force is applied at the mirror assembly) or too weak (and thus may break away when a force well below the threshold force is applied at the mirror assembly).

As described further below, the mirror assembly provides a single-fastener attachment design where the mounting structure of the mirror assembly may be attached at the interior portion of the vehicle via a single fastener, such as a threaded fastener like a bolt or screw, that does not require sliding or twisting of the mounting structure and thus does not introduce a keep-out zone or interference region affecting installation of neighboring components at the interior portion of the vehicle. For example, the threaded fastener may be installed using a standard screwdriver tool and provide an initially very solid attachment with simple installation. When a force is applied at the mirror assembly, such as during impact with an object or during regulatory testing, the mounting structure deflects or collapses or breaks away from the interior portion of the vehicle, such as to comply with regulatory requirements.

As shown in FIG. 1, the mounting structure or stay 20 includes a mounting arm 22 attached to the mirror head 12 and an attachment portion 24 at an end of the mounting arm 22 distal from the mirror head 12 that is configured to attach to the interior portion 18 of the vehicle. The mounting structure 20 may comprise an injection molded polymeric or plastic material or a die-cast material, such as an aluminum or zinc compound. A ball member of the mounting arm 22 may be pivotally received at a socket of the mirror head 12 to form a pivot joint for adjusting the mirror head 12 relative to the mounting structure 20, such as when the driver moves the mirror head 12 to adjust the rearward view provided by the mirror reflective element 16. The attachment portion 24 includes an aperture 26 formed through an end of the attachment portion 24 that engages the interior portion 18 of the vehicle, and a retention feature or fastener 28, such as a threaded fastener like a bolt or screw, extends through the aperture 26 to threadedly attach the mounting structure 20 at the interior portion 18. The aperture 26 may extend from an interior portion of the mounting structure 20 and a cover panel or door 22a of the mounting arm 22 is removable to provide access to the interior portion of the mounting structure 20 for installation of the fastener 28 and attachment of the mounting structure 20 at the interior portion 18 via tightening of the fastener 28.

A neck or collar or extension 32 may extend from the attachment portion 24 to engage the interior portion 18. The aperture 26 extends through the extension 32 so that the fastener 28 extends along the extension 32 to attach the mounting structure 20 at the interior portion 18 of the vehicle. For example, with the mounting structure 20 attached at the interior portion 18 via the threaded fastener or bolt 28, a head of the bolt may engage an interior surface of the mounting structure 20, with the bolt 28 extending along the aperture 26 through the extension 32 and being threadedly received at the interior portion 18. Fastening the bolt 28 to the interior portion 18 may apply a clamping or compression force between the bolt head and the interior portion 18 and at the attachment portion 24 and/or extension 32 to secure the mounting structure 20 at the interior portion.

The attachment portion 24 and/or extension 32 may be configured to fracture or collapse or deflect relative to the mounting arm 22 when a force is applied to the mounting arm 22. For example, the wall thickness of the attachment portion 24 may be narrowed around the extension 32 so that the attachment portion has a frangible portion that circumscribes the extension. That is, the attachment portion 24 may include a notched region or breakaway region 24a where the wall of the attachment portion 24 is narrowed or weakened. The notched region 24a circumscribes the extension 32 so that, when the attachment portion 24 experiences a force applied at the mounting structure 20, such as from an impact at the mirror head 12, the notched region 24a breaks or separates or collapses the attachment portion 24 relative to the extension 32. Thus, when the force is experienced at the mounting structure 20, the attachment portion 24 may deflect, collapse or break away from the extension 32 at the breakaway region 24a so that the extension 32 remains at the interior portion 18 via attachment of the fastener 28, and the mounting arm 22, the attachment portion 24 and the mirror head 12 may deflect, collapse or break away relative to the extension 32. For example, the mounting structure 20 may deflect, collapse or break away when a force of 400 Newtons or less is applied at the mirror head or mounting structure 20 (such as in accordance with Federal Motor Vehicle Safety Standards (FMVSS) 111). When the attachment portion 24 separates from the extension 32, there may be 10 millimeters or less projecting from the base and the mounting structure 20 may not have cracks that exceed 2.5 millimeters offset and 2.5 millimeters on either side of the crack (5 millimeters maximum chip size) (such as in accordance with Economic Commission for Europe Regulation 46 (ECE R46)). Because the attachment portion 24 may separate from the extension 32 when the force is experienced at the mounting structure, the mirror assembly may include a tether (attached at the mirror stay and at the headliner or at the extension) so that the mirror assembly is not loose after impact.

Figure 2B:
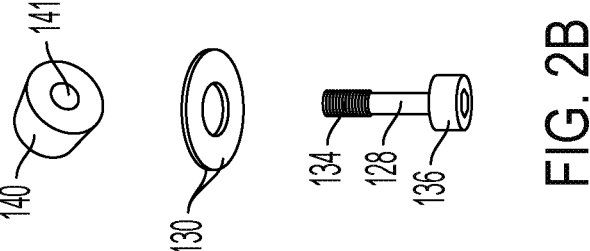
FIG. 2B is an exploded view of the threaded fastener, a washer and the compressible component of the interior rearview mirror assembly of FIG. 2A.
Figure 2A:
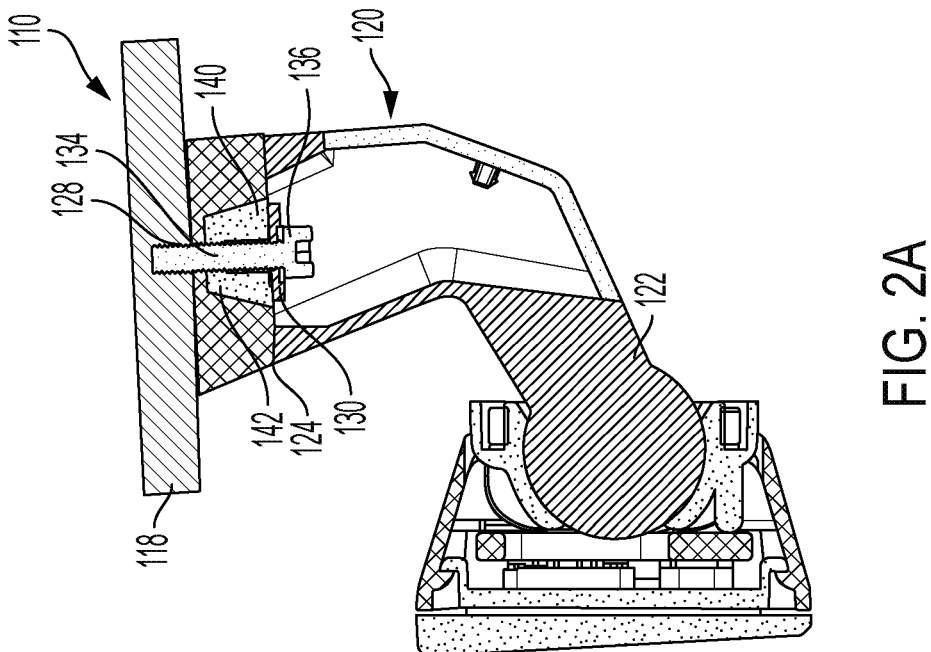
FIG. 2A is a sectional view of another interior rearview mirror assembly with a compressible component disposed between an end of the threaded fastener and an interior portion of the mounting base.
Figure 3:
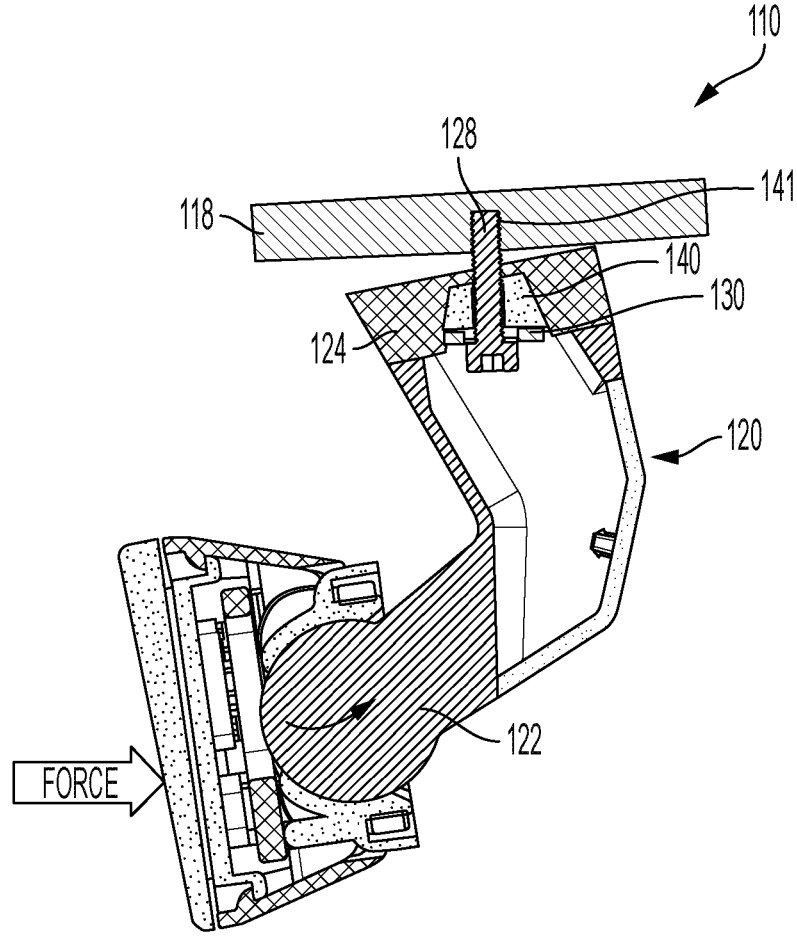
FIG. 3 is a sectional view of the interior rearview mirror assembly of FIG. 2A with a force applied to the mirror head and the mounting base moved relative to the threaded fastener and the interior portion of the vehicle, and the compressible component being compressed to accommodate movement of the mounting base relative to the interior portion.

Referring to FIGS. 2A-3, a mirror assembly 110 includes a mounting structure 120 with a mounting arm 122 that pivotally receives the mirror head and an attachment portion 124 that attaches the mounting structure at the interior portion 118 of the vehicle. A retention feature or fastener 128, such as a threaded fastener like a bolt or screw, extends through the attachment portion 124 and is threadedly received at the interior portion 118 of the vehicle to attach the mounting structure 120 to the interior portion 118 of the vehicle. A washer 130 and a compressible element or component 140 are positioned along the fastener 128 between the interior surface of the attachment portion 124 and a flange head 136 of the fastener 128. For example, the fastener 128 extends through the washer 130 and along an aperture or passageway 141 of the compressible component 140. Optionally, the washer 130 may be integrally formed with the fastener 128, such as at the head 136.

The fastener 128 may include a machine thread portion or threaded end 134 opposite the head 136 of the fastener 128 and that is threadedly received at the interior portion 118 of the vehicle and the retention feature 128 may include an unthreaded zone or shank between the head 136 and the threaded portion 134, such as to make the fastener 128 captive in the mirror assembly 110 during shipment. Optionally, the mounting arm 122 may include structure that prevents the fastener 128 from backing out after installation. For example, the fastener 128 may push past one or more flexible ribs or plastic ribs during assembly. The flexible ribs may flex during installation of the fastener 128 to accommodate movement of the fastener past the ribs and, with the fastener 128 installed at the mounting structure 120, the one or more ribs preclude removal of the fastener 128 and act as anti-backout elements for the fastener 128.

The compressible component 140 may be disposed at least partially within a recess 142 at the interior surface or portion of the attachment portion 124. The compressible component 140 may be formed from rubber, silicone, polyurethane, or any other suitable material for compression within the recess 142 between the attachment portion 124 and the washer 130. For example, the compressible component 140 may include a rubber stopper configured to provide a compression load between the mounting structure 120 and the interior portion 118 of the vehicle when the fastener 128 is threadedly attached at the interior portion of the vehicle. The compressible component 140 may be formed as a conical-shaped element or a rounded element or a dome-shaped element or a hemispherical-shaped element or a cylindrical element, and the recess 142 may be formed as a conical-shaped recess or a rounded recess or a dome-shaped recess or a hemispherical-shaped recess or a cylindrical recess so as to at least partially receive the compressible conical-shaped element 140, and the recess 142 may allow for compression and/or expansion of the compressible conical-shaped element 140 when a sufficient force is applied at the mirror head or mounting arm.

That is, with the mounting structure 120 attached at the interior portion 118 of the vehicle and no force applied at the mirror hear or mounting structure 120, the compressible component 140 may be in a relaxed or non-compressed state or a slightly or partially compressed state (FIG. 2A). When a force is applied at the mirror head or mounting structure 120, the mounting structure 120 may be moved or manipulated in a manner that may alter the position of the mounting arm 122 and the attachment portion 124 relative to the interior portion 118 of the vehicle, where the compressible component 140 is in a compressed state to accommodate the movement of the mounting structure 120 relative to the interior portion 118 (FIG. 3). When the force is applied at the mirror head or mounting structure, the compressible component 140 is compressed toward the compressed or partially compressed state to accommodate an offset of the mounting structure 120 relative to the interior portion 118 of the vehicle and the fastener 128 fixed relative to the interior portion 118. Stated differently, the compressible component 140 may be compressed or partially compressed when a sufficient force is applied to the mirror head or mounting structure 120 that offsets or moves the mounting structure 120 away from the interior portion 118 of the vehicle, such that the offset of the mounting structure 120 causes the compressible component 140 to at least partially compress between the fastener 128 and attachment portion 124 to accommodate the offset or movement without breaking or fracturing of the mounting structure.

As shown in FIG. 3, the compressible component 140 is compressed to accommodate the movement of the mounting arm 122 relative to the interior portion 118 and may absorb or otherwise minimize or reduce the force transferred to the fastener 128 that attaches the mounting structure 120 to the interior portion 118 of the vehicle. Stated differently, the compressible component 140 is configured to minimize or reduce forces applied to the mounting structure and the fastener via compression and flexion of the compressible component 140 within the recess 142. The compressible component 140 may return to its initial or non-compressed form or position or state (FIG. 2A) when the force at the mirror assembly 110 is removed or reduced. For example, when being acted on by a load above normal usage, the mounting arm 122 may pivot or rotate or otherwise move relative to the interior portion of the vehicle at which it is mounted, resulting in compression of the compressible component 140, and the mounting arm 122 may return to the original position once the load is removed or reduced and the compressible component 140 decompresses or expands. Elasticity of the compressible component 140 may bias the mounting structure 120 toward its original or default or installed position (FIG. 2A).

Forces may be applied to the mounting arm 122 during assembly of the mirror assembly 110 with the interior portion 118 of the vehicle that may result in compression and subsequent decompression of the compressible component 140, such that assembly and installation of the mirror assembly may be enhanced. For example, after the mounting structure 120 is attached at the interior portion 118 via the fastener 128 and compressible component 140, the mounting structure 120 may be moved to accommodate installation of another vehicular component near the mirror assembly, with the compressible component 140 compressing to accommodate movement of the mounting structure and decompressing to bias or urge the mounting structure back toward its installed position.

Figures 4A, 4B:
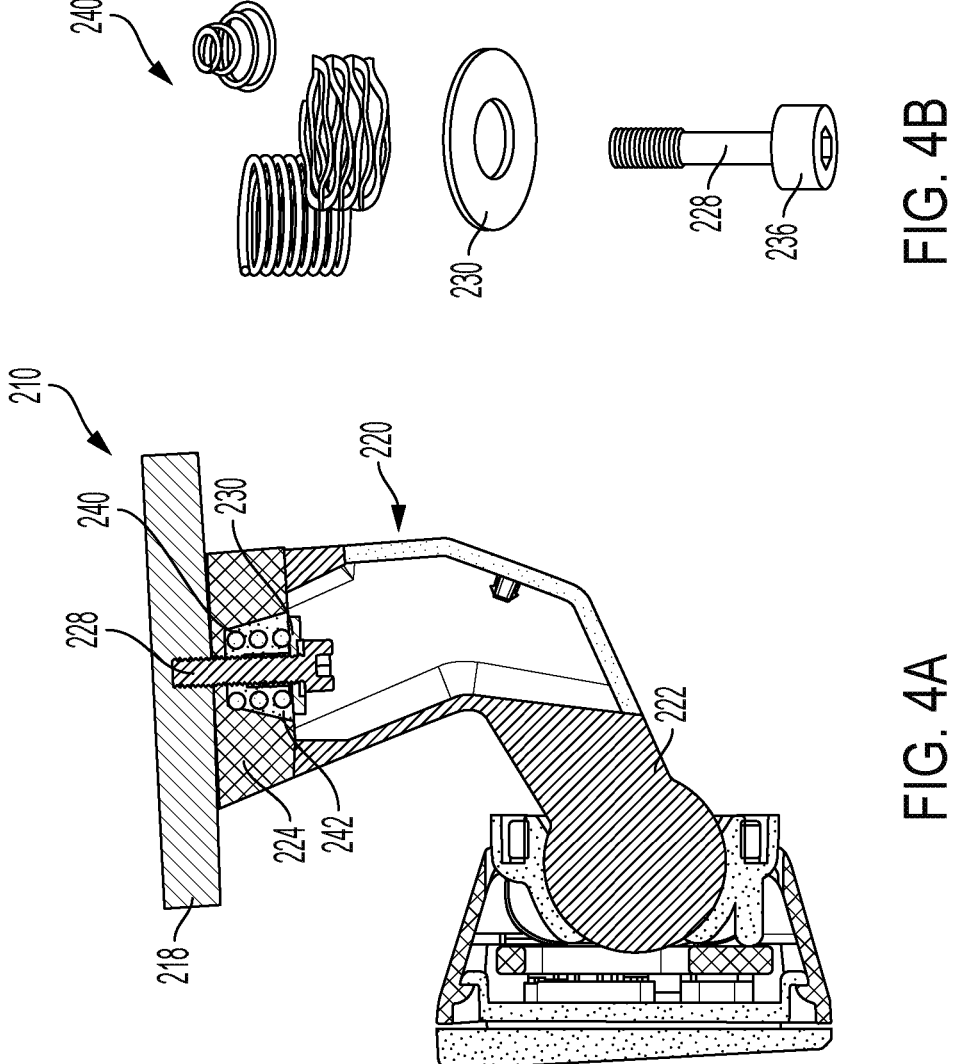
FIG. 4A is a sectional view of another interior rearview mirror assembly with another compressible component disposed between an end of the threaded fastener and the interior portion of the mounting base.
FIG. 4B is an exploded view of the threaded fastener, the washer and suitable compressible components of the interior rearview mirror assembly of FIG. 4A.
Figure 5:
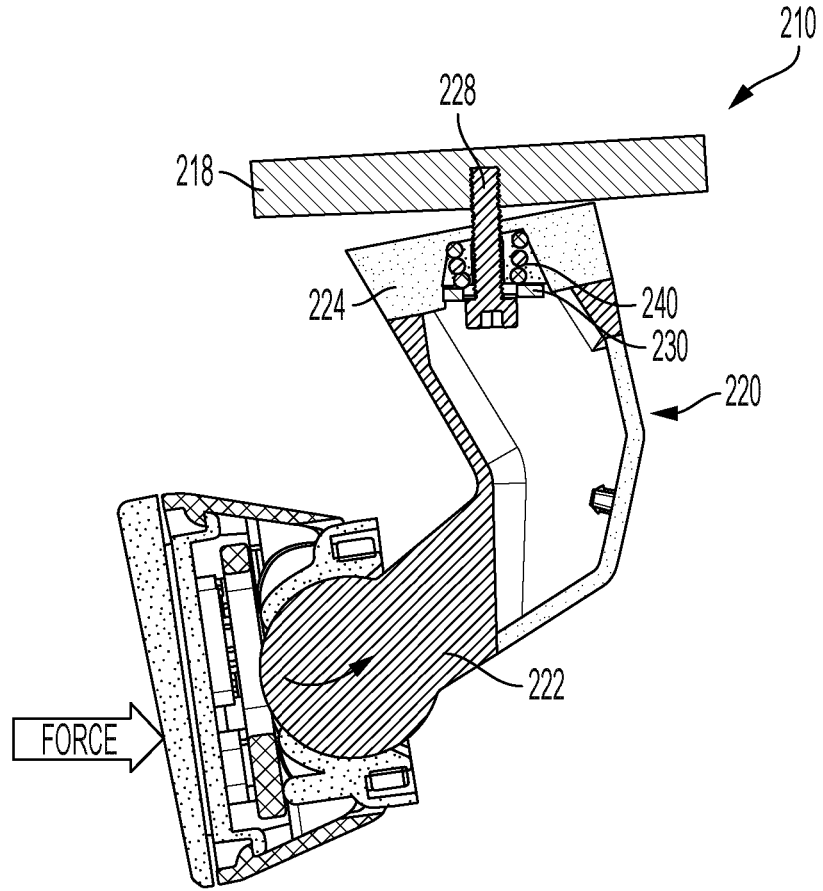
FIG. 5 is a sectional view of interior rearview mirror assembly of FIG. 4A with a force applied to the mirror head and the mounting base moved relative to the threaded fastener and the interior portion of the vehicle, and the compressible component being compressed to accommodate movement of the mounting base relative to the interior portion.

Referring to FIGS. 4A-5, a mirror assembly 210 includes a mounting structure 220 with a mounting arm 222 and an attachment portion 224. A fastener 228, such as a threaded fastener like a bolt or screw, extends through the attachment portion 224 and is threadedly received at the interior portion 218 of the vehicle to attach the mounting structure 220 to the interior portion 218 of the vehicle. The fastener 228 extends through a washer 230 and through a compressible element or component 240 positioned at the attachment portion 224. The fastener 228 may be separate from or integrally formed with the washer 230. The fastener 228 may include a threaded portion 234 and a flange head 236, with an unthreaded zone or shank between the head 236 and the threaded portion 234 to make the fastener 228 captive in the mirror assembly 210 during shipment. Optionally, the mounting structure 220 includes one or more flexible ribs that flex to accommodate installation of the fastener 228 and that preclude removal of the fastener 228 after installation.

The compressible component 240 may be disposed at least partially within a recess 242 at the interior surface or portion of the attachment portion 224. The compressible component 240 comprises a biasing element, such as a steel compression coil spring, flat wire spring, wave spring, conical spring, or any other practicable biasing member suitable for compression within the recess 242. For example, the compressible component 240 may include a biasing member configured to provide a compression load between the mounting structure 220 and the interior portion 218 of the vehicle when the fastener 228 is threadedly attached at the interior portion 218 of the vehicle. A shape of the recess 242 may correspond to a shape of the compressible component 240. For example, the recess 242 may provide a conical-shaped recess configured to receive a conical-shaped compressible component 240 or the recess 242 may provide a cylindrical-shaped recess configured to receive a cylindrical-shaped compressible component 240 such as a coil spring.

With the mounting structure 220 attached at the interior portion 218 of the vehicle and no force applied at the mirror hear or mounting structure 220, the compressible component 240 may be in a relaxed or non-compressed state or a slightly or partially compressed state (FIG. 4A). When a force is applied at the mirror head or mounting structure 220, the mounting structure 220 may be moved or manipulated in a manner that may alter the position of the mounting arm 222 and the attachment portion 224 relative to the interior portion 218 of the vehicle, where the compressible component 240 is in a compressed state to accommodate movement of the mounting structure 220 relative to the interior portion 218 (FIG. 5). When the force is applied, the compressible component 240 is compressed toward the compressed or partially compressed state to accommodate an offset of the mounting structure 220 relative to the interior portion 218 of the vehicle and the fastener 228 fixed relative to the interior portion 218. Stated differently, the compressible component 240 may be compressed or partially compressed when a sufficient force is applied to the mirror head or the mounting structure 220 that offsets or moves the mounting structure 220 away from the interior portion 218 of the vehicle, such that the offset of the mounting structure 220 causes the compressible component 240 to at least partially compress between the fastener 228 and the attachment portion 224 to accommodate the offset or movement without breaking or fracturing of the mounting structure 220.

As shown in FIG. 5, the compressible component 240 is compressed to accommodate the movement of the mounting arm 222 relative to the interior portion 218 and may absorb or otherwise minimize or reduce the force transferred to the fastener 228 that attaches the mounting structure 220 to the interior portion 218 of the vehicle. Stated differently, the compressible component 240 is configured to minimize or reduce forces applied to the mounting structure 220 and the fastener 228 via compression and flexion of the compressible component 240 within the recess 242. The compressible component 240 may return to its initial or non-compressed form or position or state (FIG. 4A) when the force at the mirror assembly 210 is removed or reduced. For example, when being acted on by a load above normal usage, the mounting arm 222 may pivot or rotate or otherwise move relative to the interior portion of the vehicle at which it is mounted, resulting in compression of the compressible component 240, and the mounting arm 222 may return to the original position once the load is removed or reduced and the compressible component 240 decompresses or expands. Biasing force from the compressible component 240 may urge the mounting structure 220 toward its original or default or installed position (FIG. 4A).

Forces may be applied to the mounting arm 222 during assembly of the mirror assembly 210 with the interior portion 218 of the vehicle that may result in the compression and subsequent decompression of the compressible component 240, such that assembly and installation of the mirror assembly 220 may be enhanced. For example, after the mounting structure 220 is attached at the interior portion 218 via the fastener 228 and compressible component 240, the mounting structure 220 may be moved to accommodate installation of another vehicular component near the mirror assembly, with the compressible component 240 compressing to accommodate movement of the mounting structure and decompressing to bias or urge the mounting structure back toward its installed position.

Thus, with the compressible component that compresses between the fastener and attachment portion when the mounting structure moves relative to the interior portion of the vehicle, the mirror assembly may deflect relative to the interior portion and remain attached at the interior portion without fracturing or separating. For example, the mounting structure may deflect relative to the interior portion and not break away, therefore at least partially compressing the compressible component, when a force of 400 Newtons or less is applied at the mirror head or mounting structure (such as in accordance with FMVSS 111 and ECE R46).

The interior mirror assembly comprises a dual-mode interior rearview video mirror that can switch from a traditional reflection mode to a live-video display mode, such as is by utilizing aspects of the mirror assemblies and systems described in U.S. Pat. Nos. 11,242,008; 10,442,360; 10,421,404; 10,166,924 and/or 10,046,706, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

The reflective element and mirror casing are adjustable relative to a base portion or mounting assembly to adjust the driver's rearward field of view when the mirror assembly is normally mounted at or in the vehicle. The mounting assembly may utilize aspects of the single-ball or single-pivot mounting assembly or the double-ball or double-pivot mounting configuration described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties.

The mirror assembly may comprise any suitable construction, such as, for example, a mirror assembly with a reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

The mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,525,264; 5,610,756; 5,406,414; 5,253,109; 5,076,673; 5,073,012; 5,117,346; 5,668,663; 5,910,854; 5,142,407 and/or 4,712,879, which are hereby incorporated herein by reference in their entireties.

The mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:

a mirror head adjustable about a mounting base, wherein the mounting base is configured to attach at an interior portion of a vehicle equipped with the vehicular interior rearview mirror assembly;

wherein the mirror head comprises a mirror reflective element;

wherein the mounting base is configured to attach at the interior portion of the vehicle via a threaded fastener;

wherein the threaded fastener includes a head end and a threaded end opposite the head end;

wherein a compressible component is disposed between the head end of the threaded fastener and the mounting base;

wherein the threaded end threadedly engages the interior portion of the vehicle when the mounting base is attached at the interior portion of the vehicle; and wherein, with the mounting base attached at the interior portion of the vehicle via the threaded fastener, and responsive to movement of the mounting base relative to the threaded fastener and the interior portion of the vehicle, (i) the compressible component at least partially compresses between the threaded fastener and the mounting base to accommodate movement of the mounting base and (ii) the threaded end of the threaded fastener remains threadedly engaged with the interior portion of the vehicle as the mounting base moves relative to the threaded fastener and the interior portion of the vehicle.

2. The vehicular interior rearview mirror assembly of claim 1, wherein the compressible component is disposed between a flange at the head end of the threaded fastener and an inner surface of the mounting base.

3. The vehicular interior rearview mirror assembly of claim 2, wherein the flange comprises a washer disposed at the threaded fastener.

4. The vehicular interior rearview mirror assembly of claim 1, wherein the compressible component is disposed at least partially within a recess at an inner portion of the mounting base.

5. The vehicular interior rearview mirror assembly of claim 4, wherein the compressible component comprises a conical shape, and wherein the recess comprises a conical shape corresponding to the conical shape of the compressible component.

6. The vehicular interior rearview mirror assembly of claim 1, wherein the threaded fastener extends through the compressible component.

7. The vehicular interior rearview mirror assembly of claim 1, wherein the mounting base comprises (i) an attachment portion that attaches at the interior portion of the vehicle and (ii) a mounting arm that attaches at the mirror head.

8. The vehicular interior rearview mirror assembly of claim 7, wherein the attachment portion and the mounting arm are integrally formed with one another.

9. The vehicular interior rearview mirror assembly of claim 7, wherein the mounting arm comprises a ball member that is pivotally received at a socket of the mirror head.

10. The vehicular interior rearview mirror assembly of claim 1, wherein, with the mounting base attached at the interior portion of the vehicle via the threaded fastener, and responsive to a force greater than a threshold force being applied at the vehicular interior rearview mirror assembly, the mounting base moves relative to the threaded fastener and the interior portion of the vehicle.

11. The vehicular interior rearview mirror assembly of claim 10, wherein the threshold force is less than or equal to 400 Newtons.

12. The vehicular interior rearview mirror assembly of claim 1, wherein the compressible component comprises a rubber material.

13. The vehicular interior rearview mirror assembly of claim 1, wherein the compressible component comprises one selected from the group consisting of (i) a coil spring, (ii) a wave spring and (iii) a conical spring.

14. A vehicular interior rearview mirror assembly, the vehicular interior rearview mirror assembly comprising:

a mirror head adjustable about a mounting base, wherein the mounting base is configured to attach at an interior portion of a vehicle equipped with the vehicular interior rearview mirror assembly;

wherein the mirror head comprises a mirror reflective element;

wherein the mounting base is configured to attach at the interior portion of the vehicle via a threaded fastener;

wherein the threaded fastener includes a head end and a threaded end opposite the head end;

wherein a compressible component is disposed between a flange at the head end of the threaded fastener and an inner surface of the mounting base, and wherein the threaded fastener extends through the compressible component;

wherein the compressible component comprises a rubber material, and wherein the compressible component is disposed at least partially within a recess at the inner surface of the mounting base;

wherein the threaded end threadedly engages the interior portion of the vehicle when the mounting base is attached at the interior portion of the vehicle; and wherein, with the mounting base attached at the interior portion of the vehicle via the threaded fastener, and responsive to movement of the mounting base relative to the threaded fastener and the interior portion of the vehicle, (i) the compressible component at least partially compresses between the threaded fastener and the mounting base to accommodate movement of the mounting base and (ii) the threaded end of the threaded fastener remains threadedly engaged with the interior portion of the vehicle as the mounting base moves relative to the threaded fastener and the interior portion of the vehicle.

15. The vehicular interior rearview mirror assembly of claim 14, wherein the compressible component comprises a conical shape, and wherein the recess comprises a conical shape corresponding to the conical shape of the compressible component.

16. The vehicular interior rearview mirror assembly of claim 14, wherein the mounting base comprises (i) an attachment portion that attaches at the interior portion of the vehicle and (ii) a mounting arm that attaches at the mirror head.

17. The vehicular interior rearview mirror assembly of claim 14, wherein, with the mounting base attached at the interior portion of the vehicle via the threaded fastener, and responsive to a force greater than a threshold force being applied at the vehicular interior rearview mirror assembly, the mounting base moves relative to the threaded fastener and the interior portion of the vehicle.

18. A vehicular interior rearview mirror assembly, the vehicular interior rearview mirror assembly comprising:

a mirror head adjustable about a mounting base, wherein the mounting base is configured to attach at an interior portion of a vehicle equipped with the vehicular interior rearview mirror assembly;

wherein the mounting base comprises (i) an attachment portion that attaches at the interior portion of the vehicle and (ii) a mounting arm that attaches at the mirror head;

wherein the mounting arm comprises a ball member that is pivotally received at a socket of the mirror head;

wherein the mirror head comprises a mirror reflective element;

wherein the mounting base is configured to attach at the interior portion of the vehicle via a threaded fastener;

wherein the threaded fastener includes a head end and a threaded end opposite the head end;

wherein a compressible component is disposed between the head end of the threaded fastener and the mounting base;

wherein the threaded end threadedly engages the interior portion of the vehicle when the mounting base is attached at the interior portion of the vehicle;

wherein, with the mounting base attached at the interior portion of the vehicle via the threaded fastener, and responsive to a force greater than a threshold force being applied at the vehicular interior rearview mirror assembly, the mounting base moves relative to the threaded fastener and the interior portion of the vehicle; and wherein, responsive to movement of the mounting base relative to the threaded fastener and the interior portion of the vehicle, (i) the compressible component at least partially compresses between the threaded fastener and the mounting base to accommodate movement of the mounting base and (ii) the threaded end of the threaded fastener remains threadedly engaged with the interior portion of the vehicle as the mounting base moves relative to the threaded fastener and the interior portion of the vehicle.

19. The vehicular interior rearview mirror assembly of claim 18, wherein the threshold force is less than or equal to 400 Newtons.

20. The vehicular interior rearview mirror assembly of claim 18, wherein the compressible component comprises one selected from the group consisting of (i) a coil spring, (ii) a wave spring and (iii) a conical spring.

* * * * *